United States Patent [19]
Vogt et al.

[11] 3,904,798
[45] Sept. 9, 1975

[54] VARYING DENSITY CARTRIDGE FILTERS
[75] Inventors: Clifford M. Vogt, Madison; John W. Soehngen, Berkeley Heights; Joseph C. Polise, Morris Plains, all of N.J.
[73] Assignee: Celanese Corporation, New York, N.Y.
[22] Filed: Oct. 23, 1973
[21] Appl. No.: 408,685

Related U.S. Application Data
[62] Division of Ser. No. 837,833, March 24, 1972, Pat. No. 3,801,400.

[52] U.S. Cl. .................. 428/36; 55/487; 210/502; 428/218; 428/219; 428/244; 428/296; 428/305; 428/340
[51] Int. Cl.² ... D04H1/04; B01D50/00; B01D 39/16
[58] Field of Search .............. 55/487; 210/500, 502; 161/47, 166, 150, 162; 131/264, 265, 266, 269

[56] References Cited
UNITED STATES PATENTS

| | | | |
|---|---|---|---|
| 2,980,204 | 4/1961 | Jordan | 55/487 |
| 3,102,014 | 8/1963 | Aitkenhead | 55/487 X |
| 3,252,270 | 5/1966 | Pall et al. | 210/502 UX |
| 3,381,070 | 4/1968 | Sublett et al. | 131/269 X |
| 3,449,245 | 6/1969 | Johnson et al. | 210/502 X |

Primary Examiner—George F. Lesmes
Assistant Examiner—Alan T. McDonald
Attorney, Agent, or Firm—Andrew F. Sayko, Jr.

[57] ABSTRACT

Polypropylene or other fiber-forming polymer is melt extruded as a continuous molten stream which is attenuated by a plurality of gaseous streams into a fine filament and projected onto a rotating collection surface, such as a mandrel. During collection there is changed, one or more times, at least one of (i) temperature of the filament-forming material, (ii) the speed of extrusion, (iii) the speed of rotation of said collector, (iv) the distance between extruder and collector, or (v) the weight of an idler roll on the collector, thereby to form an annular layer whose density differs relatively from the layer immediately preceding it.

The resulting cylindrical, self-bonded, nonwoven structure has a predetermined, density profile. For uses such as filtration, the fluid to be filtered enters from the low density side so that solids will deposit throughout the filter more or less uniformly rather than building up so much in the first-contacted layer that it becomes fully clogged before the balance has had any appreciable solids build-up.

11 Claims, 12 Drawing Figures

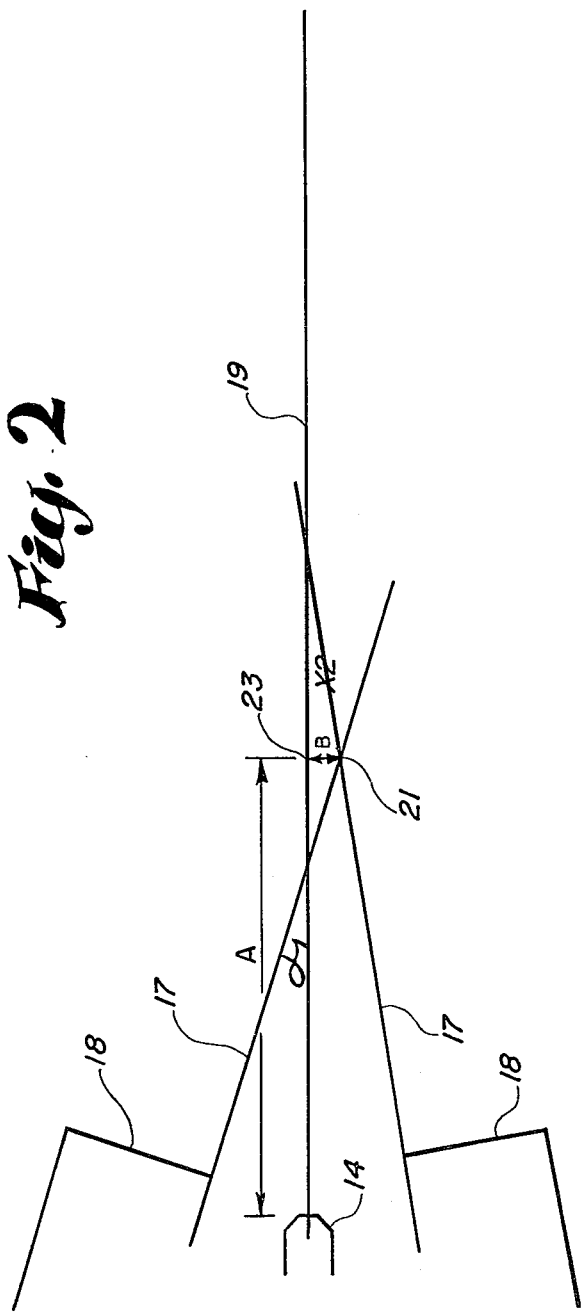
Fig. 2
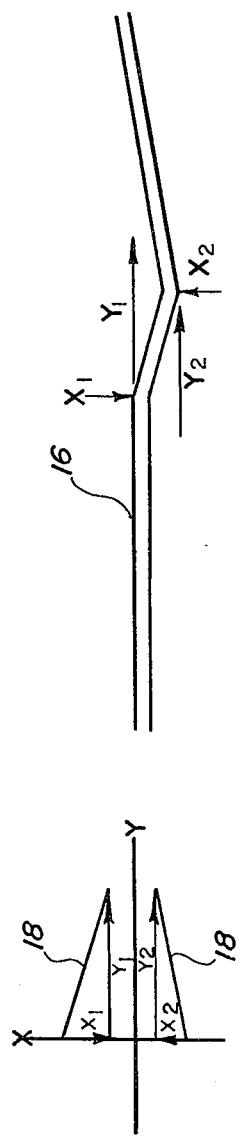
Fig. 2a
Fig. 2b

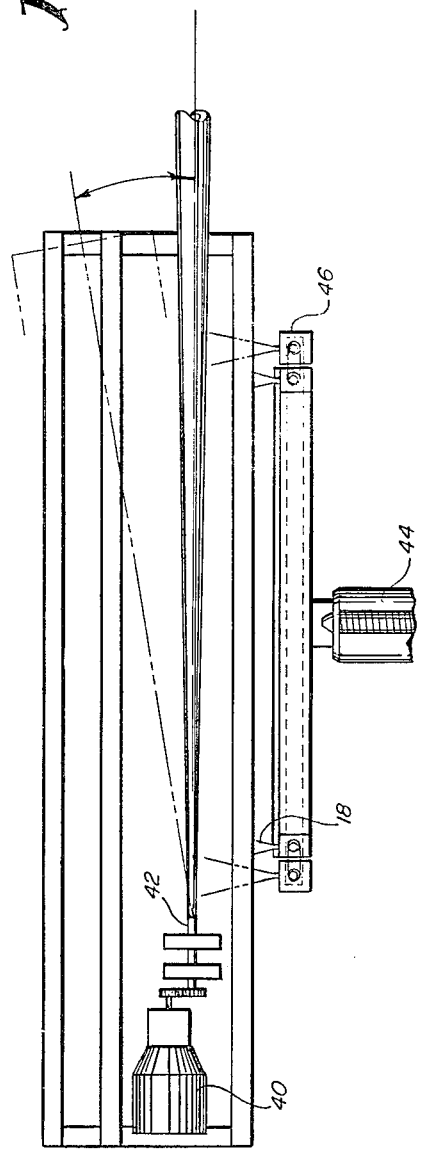
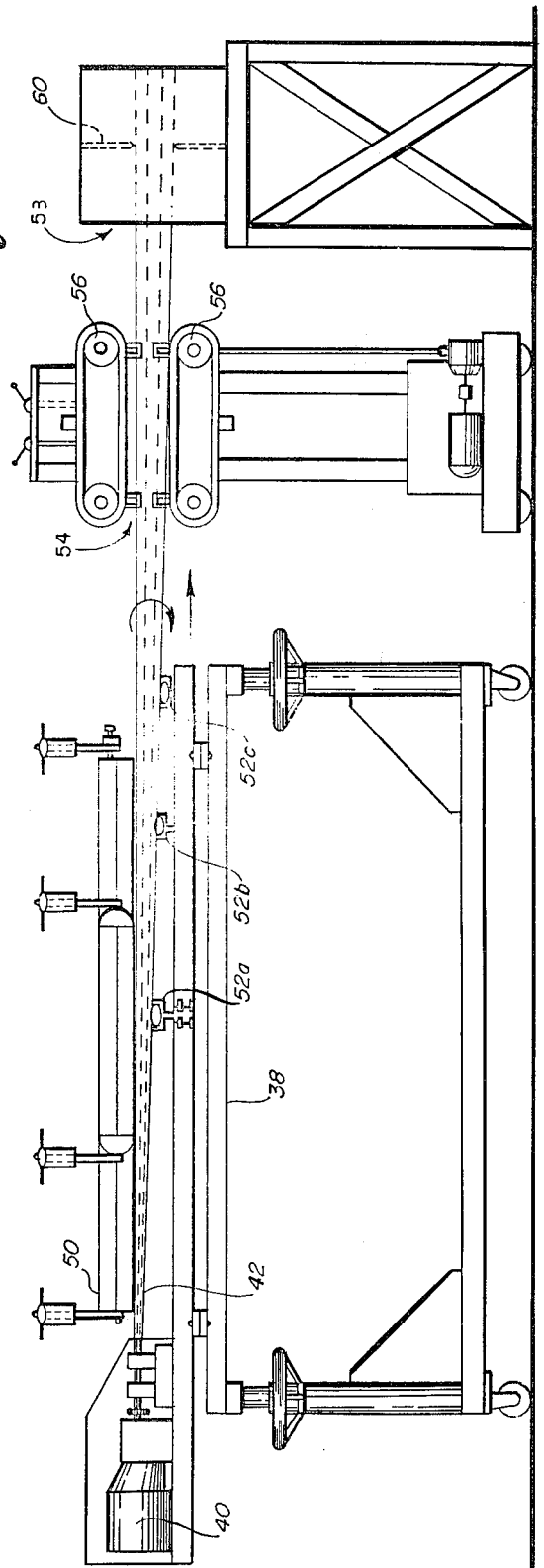

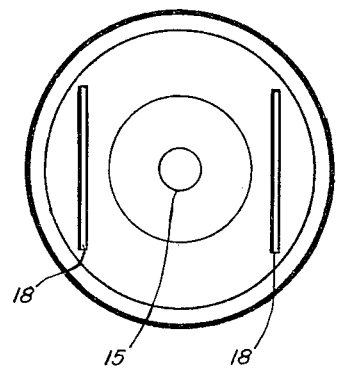
*Fig.* 7
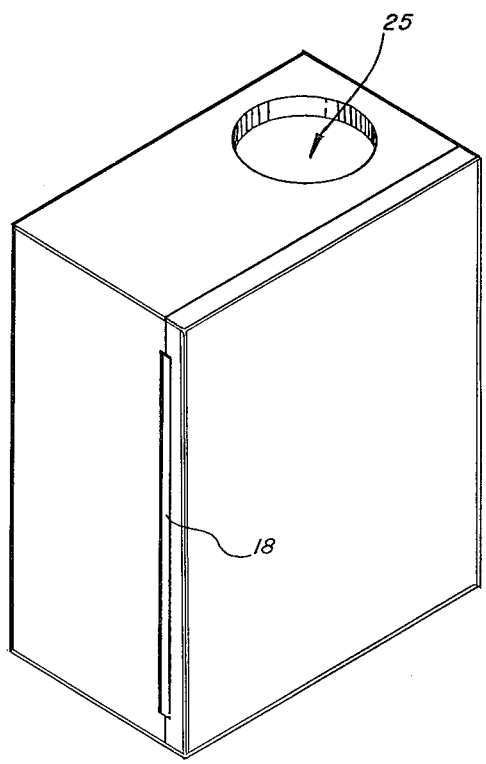
*Fig.* 9
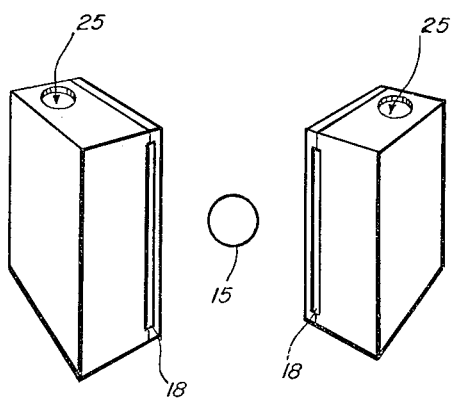
*Fig.* 8

VARYING DENSITY CARTRIDGE FILTERS

This is a division of application Ser. No. 837,833, filed Mar. 24, 1972, now U.S. Pat. No. 3,801,400.

The present invention relates to self-bonded, non-woven structures of predetermined density profile across their thickness and to processes for their production.

Non-woven structures of either sheet-like or annular cartridge form are known and are generally prepared from staple fibers, either natural or synthetic, and binders. In such form they have proven useful for a variety of end uses, especially for filtration. In filtration, obviously, the face of the product which first encounters the material to be filtered will receive the greatest amount of solid material and will become clogged long before the balance of the filter approaches its capacity.

Another filter structure described in the art comprises an annular cylinder produced by winding yarn in a predetermined loose pattern on a bobbin so as to leave much open space in which solids can be entrained during filtration, but such a structure has the same problem of incomplete utilization of its full capacity when replacement is needed. This applies as well to continuous filament structures of the type disclosed in U.S. Pat. No. 3,148,101.

In one attempt to deal with the problem, staple fiber structures have been provided with a varying density profile across their thickness, presumably by varying the fiber make-up and/or proportion of activatable binder. While such filters have performed satisfactorily, they are much more expensive to produce than filters of uniform density. Moreover, reproducibility is a problem, resulting in a high proportion of rejects. In addition, the needs of the product do not permit it to be produced by the more economical continuous processes which take solid filament-forming material, melt it, extrude it and then collect the extrudate.

It is accordingly an object of the invention to provide self-bonded cylindrical fibrous structures of predetermined density profiles across their thickness.

It is a further object of the invention to provide a simple, economical process for producing such structures reliably.

These and other objects and advantages are realized in accordance with the present invention pursuant to which there are provided novel self-bonded, non-woven structures comprising randomly arranged substantially continuous fibrous material, which structures at at least two different locations in their thicknesses differ in density by at least about 10 percent. The structures are cylindrical and preferably are annular cylinders produced by (A) first extruding toward a rotating collector, a filament-forming synthetic material as a filament stream in liquid phase under conditions to form fibrous material, attenuating the extrudate utilizing a plurality of converging gas streams having their major force component in the direction of the filament stream, the fibrous material when it hits said collector being tacky and adhering to previous layers thereof and forming a self-bonded structure, and (B) after a predetermined thickness has built up on said collector, extruding said material under conditions wherein relative to the first extrusion there is gradually changed at least one of (i) temperature of the filament-forming material, (ii) the speed of extrusion, (iii) the speed of rotation of said collector, (iv) the distance between extruder and collector, or (v) the weight of an idler roll on the collector, thereby to gradually change the density relative with respect to the layer immediately preceding it. Subsequently collection is discontinued, usually after additional gradual change in extrusion conditions.

For certain properties it is desirable to include solid particulate matter in the structure such as adsorbent carbon granules, silica gel, or the like, and this is advantageously effected by depositing such particles either on the rotating collector or the fibrous material moving to the collector so that the particles are embedded in the structure. Since the fibrous material is still tacky, the particles are held in place partially by adhesion as well as by being locked in by fibers. In such event, desirably deposit of particulate matter is not commenced until the cylinder being formed is at least about ⅛ inch thick and preferably at least about 3/16 inch thick; preferably deposit of solid particles is discontinued so that at both surfaces there is a solid particle-free layer. This minimizes the tendency for solids to be lost by "dusting out" during handling as well as by being washed out if liquids are passed through the cylinder. Also during start up of collection until a layer of sufficient thickness is built up there is no structure to retain solids so much particulate matter would be wasted if deposited from the outset.

Less advantageously, the solids to be incorporated in the structure may be present in the liquid being extruded provided they are so small that they do not clog the extrusion apparatus. They will readily be held in the resulting fiber matrix although their adsorption capacity will be diminished as a result of their less ready accessibility to particles undergoing filtration, i.e. their greatest adsorption capacity would be realized at those sites projecting beyond the fiber, their least at those sites embedded in and completely surrounded by the fiber.

The extrusion to form filamentary material may utilize plasticized melts or solutions of filament-forming materials in volatile solvents which are evaporated upon extrusion although preferably the extrusion involves a molten material which solidifies upon cooling. The liquid phase molten material can be extruded using the "spray spinning" technique described in U.S. Pat. No. 3,543,332, issued Dec. 1, 1970, whose disclosure is incorporated herein by reference. However, to achieve higher through-put speeds the preferred spray spinning technique is to utilize a plurality of converging sustantially planar gas streams directed substantially in the direction of flow of the extrudate stream in such a manner that the gas streams converge upon the extrudate stream. The planes of the gas streams intersect at a point which is at a distance measured perpendicularly from the axis of the extrudate stream at least equal to the diameter of the extrudate stream.

Briefly, a relatively heavy monofil is extruded and a plurality of streams of gas, e.g., steam or air, are directed at a shallow angle in the direction of flow of the freshly extruded monofil. This attenuates the monofil into relatively fine denier material and, like the more conventional drawing, also increases the tenacity of the solidified extrudate. Depending upon the conditions of extrusion, the filamentary material will be one or more substantially continuous structures, or relatively long staple fibers, or conventional length fibers, possibly mixed with varying amounts of solid debris or "shot".

The severity of the gas streams varies the attenuation and determines the denier of the resulting fibrous material which may range from about 0.1 up to about 50 or more, although for maximum surface and strength the fiber denier is preferably mostly below about 25 denier. Actually each product will include a range of deniers which will add to its strength and performance.

The extrudate is discharged onto or collected by a rotating collector so the product is a cylinder. The height or length of the cylinder can be set by traverse or by use of multiple side-by-side extruders whose spray patterns overlap. The duration of spray obviously controls the thickness of the resulting structures. The conditions of extrusion and collection are such that each new layer when deposited is sufficiently tacky so as to adhere to the preceding layer so that the total structure will be shape-retaining without further treatment.

For many filtration purposes using annular filter cartridges it is customary to introduce liquid from the outside and to cause it to pass radially inward, as noted hereinabove. In such usage as filtration proceeds and solids accumulate, they build up in the outermost layer and the filter must be replaced long before the inner layers have been used to their capacity. In accordance with the invention, therefore, the structure is provided with an outer or interior layer or stratum wherein the density is lower than at the inside surface of the annulus. This is achieved by gradually changing the extrusion or collection conditions so that the density of the collected structure will fall, as by increasing the volume of melt extruded per unit time, increasing the distance between extruder and collector, raising the temperature of the melt, speeding up the collector, reducing the pressure of the attenuating gas streams, reducing or removing a weight sometimes placed on the rotating collector to compact the structure, or the like, as well as combinations thereof, including effecting some changes which might increase the density coupled with more than compensating changes to result in an overall density decrease.

The density decrease should be at least about 10 percent and advantageously at least about 20 percent. The decrease is preferably effected gradually by continuously changing the conditions in a plurality of steps or relatively abruptly as by a series of sudden changes from one set of conditions to another.

It is also possible to have a reverse configuration wherein the density from the inside of the annulus rises in moving outwardly followed, if desired, by a subsequent reduction. Additives can be present in all or some of the strata.

In accordance with one desirable embodiment the density rises gradually initially and to a slight extent and then falls abruptly, rises again slightly and then falls abruptly once more, the density profile thus having a generally falling sawtooth configuration. The slight density increases have reference to less than about a 10 percent increase and preferably less than about a 5 percent increase, while the abrupt decreases are at least about 10 percent, as noted, the abrupt change in density occurring over less than about ⅛ inch in thickness. If the extrusion conditions for producing the structure include a relatively short distance between extruder and collector, then the build-up of material on the collector will itself further reduce the distance and produce the gradual slight increase in density. As can be seen, the density profile can be varied at will in accordance with the requirements for the particular end use intended.

In place of using a single extruder and changing the conditions, it is possible to use an extruder having two or more polymer feeds so that different polymers can be fed to the extruder in a programmed manner. It is also possible to use a plurality or extruders each with a different set of extrusion conditions (and even with a different polymer, if desired) and to move the rotating collector or the filter structure being formed successively from one station to the next, as desired. If a multiplicity of stations are involved, this can be accomplished by providing a plurality of collector stations on a turntable with a plurality of extruders positioned about the turntable. After a predetermined length of time in one position, the table rotates and each collector advances to the next extruder, the last collector moving to a station having no extruder so that its accumulated fibrous structure can be removed and collection resumed when the next advance takes place. The collector comprises a mandrel which may be unsupported at one end and which may be collapsible so it can release the annular cylinder or which may be tapered so that a smart rap on the end of the cylinder at the base of the mandrel will dislodge the cylinder and permit it to be removed over the mandrel tip.

Another suitable apparatus for producing a continuous structure which can be severed into predetermined lengths comprises an internally cooled mandrel against which several extrusion jets discharge material under individual, differing conditions. The mandrel rotates and means are provided to advance the entire built-up structure in axial direction so that annular material, rigid in structure, continuously moves beyond the end of the mandrel to a cutting station where it is severed into predetermined lengths. Means for applying solids and/or different weights can also be included.

Deposition of solids can be associated with one or more stations, as desired, preferably omitting at least the first and last stations so that the product will be free of solids in its outermost layers, thereby avoiding dusting out as discussed hereinabove.

The filament-forming material may comprise any known suitable polymeric material which is plasticizable, soluble or fusible. If soluble materials are used in conjunction with a solvent, the problem of solvent removal is encountered which, of course, is avoided where fusible materials are employed. Representative fusible materials include polyolefins such as homopolymers and copolymers of olefins, e.g. ethylene and propylene, especially stereospecific or crystalline polyethylene and polypropylene; polyamides such as nylon 66, nylon 6, and the like; polyesters such as polyethylene terephthalate; cellulose esters such as cellulose acetate, and especially the secondary triacetate, polyurethanes, polystyrene; polymers of vinylidene monomers such as vinyl chloride, vinyl acetate, vinylidene chloride and especially acrylonitrile; and mixtures thereof.

The invention will be further described with reference to the accompanying drawings wherein:

FIG. 2 is a schematic plan view of the preferred extrusion apparatus and process in accordance with the present invention;

FIG. 2a is a graph illustrating vectorily the forces resulting from two converging planar gas streams;

FIG. 2b is a schematic illustration showing how the vector force component illustrated in FIG. 2a both deflect and accelerate the filament stream;

FIG. 3 is a side elevation of a fully continuous extrusion and collection apparatus;

FIG. 4 is a plan view of the apparatus of FIG. 3, with a portion of the apparatus removed for ease of viewing;

FIG. 7 is a front elevation of one embodiment of an extrusion nozzle and planar attenuating gas jets useful in the apparatus and process illustrated in FIG. 2;

FIG. 8 is a schematic perspective illustration of an extrusion nozzle having a pair of planar attenuating gas jets positioned on each side of the extrusion nozzle;

FIG. 9 is a perspective view of a planar attenuating gas jet shown in FIG. 8.

Figure 1:
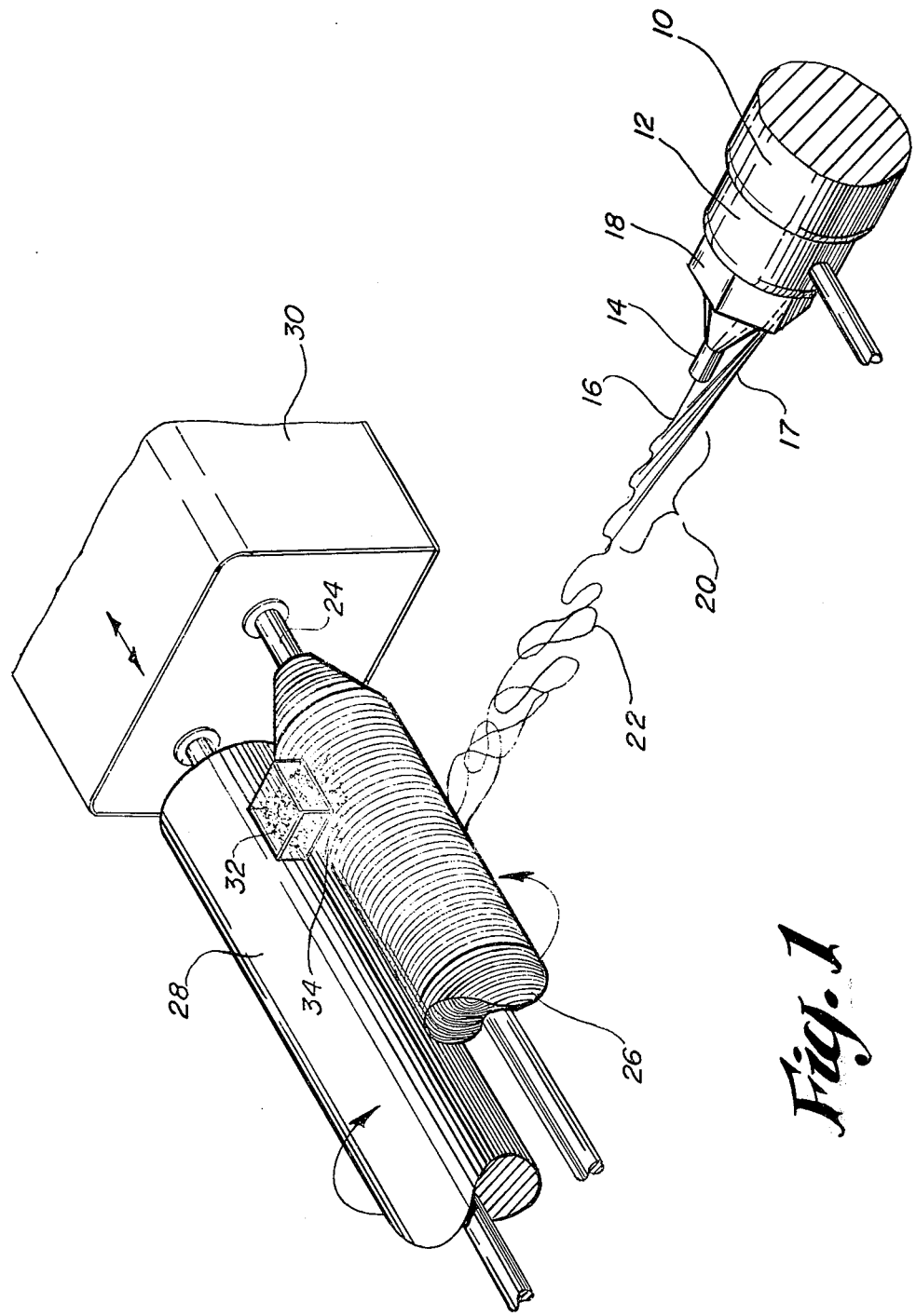
FIG. 1 is a schematic illustration of one extrusion and collection apparatus in accordance with the present invention.

Referring now more particularly to the drawings, in FIG. 1 a fiber-forming, thermoplastic polymer, preferably a polyolefin, is fed to an extruder 10 provided with an adapter section 12 to which a gas, such as steam or air, is supplied. While extrusion temperatures may be anywhere above the melting point of the polymer, it has been found that best results are obtained by heating the polymer to at least 150°C., and preferably from about 250° to about 350°C. above the softening point of the polymer being extruded. For example, polypropylene having hereinafter defined characteristics will generally be heated to temperatures of from about 325° to about 400°c. Polyethylene, on the other hand, will be heated to from about 350° to about 450°C. A hot, molten stream of polymer 16 is discharged through a nozzle 14.

It is to be understood that nozzles having one or more polymer orifices may be used. Also, a plurality of nozzles per collector may be employed. However, there must be at least two planar gas streams per polymer orifice. The attenuating gas orifices 18 are of an elongated rectangular cross-section, as shown in FIGS. 7 and 8, to emit substantially planar gas streams 17.

The gas streams 17 act on the polymer stream 16 in convergence region 20 to form an attenuated filament 22 wherein it cools and partially solidifies while moving toward a mandrel 24 on which it is collected as an annular cartridge 26. The mandrel 24 is ordinarily rotated at a speed sufficient to provide a moving surface of from about 25 to about 125 feet per minute by a motor drive. Mandrel 24 is in surface contact with roller 28, which acts as an idler roll and whose bias against the mandrel can be adjusted; the extent of the bias will effect how tightly the tacky filament packs against previous layers on the cartridge 26. Both the mandrel 24 and the roller 28 are reciprocated laterally by a traversing mechanism 30 whose throw determines the shape of the cartridge; the throw may be of constant length or may change in the course of package build-up to produce a particular shape as may be needed for acceptance in a receptacle of predetermined corresponding shape.

The force of the attenuating gas on the polymer stream causes the polymer to attenuate greatly, e.g., from 10 to 500 times, based on diameter ratios, and possibly fibrillate to a slight degree to produce a substantially continuous fiber. Some turbulence and resultant whipping about of the polymer stream occurs. consequently, a generally random, stereo reticulate structure of fiber results as the material impinges on the collector. Since the polymer is still in a somewhat molten or tacky state when it strikes the collector, some sticking together occurs at the points where fiber intersects. For brevity, this sticking will be referred to as interfiber bonding, although it is to be understood that this bonding will ordinarily result from an individual fiber looping about and sticking or bonding to itself.

For best results, the surface of mandrel 24 should be from about 6 to about 48 inches, preferably 10 to 30 inches from polymer exit nozzle 14. With greater distances the spray pattern is difficult to control and the resultant web tends to be non-uniform. Shorter distances result in a web which contains too great a quantity of "shot", i.e., beads of nonattenuated polymer, which undersirably affects subsequent processing, web uniformity and surface area.

The bias of roller 28 against cartridge 26 may be varied during operation, or the spacing between the cartridge 26 and nozzle 14, the rate of polymer extrusion, the force and quantity of gas, or the like.

A hopper 32 is positioned above the mandrel 24 and powdered material 34 such as carbon is dropped onto the cartridge during all or part of the cycle. Since the cartridge traverses and rotates, the carbon can be uniformly distributed even though the hopper is stationary. Substantially all of the fibers comprising the cartridge will have diameter falling within the range of 0.5 to 50 microns, and under preferred conditions, within the range of about 1 to about 20 microns. The density at any given part of the cartridge filter is less than 50 percent of the density of the polymer substrate. Thus when polypropylene having a density of 0.9 grams per cubic centimeter (gm/cc.) is spray spun, the density at any given part of the cartridge filter will be less than 0.45 gm/cc. Preferably the density will range from 0.1 to 0.5 gm/cc.

In FIG. 2 there is schematically shown a top view of the preferred apparatus for producing cartridge filters. A plurality of converging substantially planar gas streams 18 (which correspond to planar projections of the gas outlet passages) issue from substantially rectangular gas outlet passages 17. The axis 19 of the nozzle 14 corresponds to direction in which the polymer stream is extruded. The gas jets 17 are positioned along side the extrusion nozzle 14 in such a manner that the gas streams 18 are directed substantially in the direction of flow of the polymer extrudate along the nozzle axis 19. The planes of the gas streams (and projections of the gas outlet passages) intersect at a point 21 which is at a distance B measured perpendicularly from intersection point 21 to the nozzle axis 19. The distance B is at least equal to the diameter of the extrudate stream at a point 23 along the nozzle axis in juxtaposition to the point of intersection 21. Preferably B is at least 0.06 inch, most preferably from about 0.2 to 2.0 inches. The point 23, which defines the perpendicular distance from the nozzle 14 to the intersection point 21, is a distance A of at least 2.0 inches from the point of extrusion nozzle 14, preferably from about 2.5 to 7.0 inches. The attenuating gas jets 17 are positioned along side the extrusion nozzle such that the planes of the attenuating gas streams 18 intersect the nozzle axis 19 (also the axis of the extrudate stream) at an angle ($\alpha_1$ and $\alpha_2$) less than 45° to more than about 5°, preferably from about 10° to 40°, to project the extrudate stream away from the extrusion nozzle.

In FIG. 2a the force of the gas streams 18 are shown vectorially. The Y force component is in the direction of the extrusion nozzle axis and polymer extrudate stream, and serves to accelerate and attenuate the extrudate stream.

Angles $\alpha_1$ and $\alpha_2$, shown in FIG. 2, are not the same so that the intersection point of the planes of the gas streams is off the nozzle axis and extrudate stream. FIG. 2b shows that the effect of this is to deflect the extrudate stream 16, first to one side and then to the other, in addition to attenuating the extrudate. If $\alpha_1$ and $\alpha_2$ are identical, the planar filament streams 18 would intersect on the nozzle axis and substantially on the extrudate stream. As can be seen from the examples, this leads to much lower surface area when compared to the preferred method illustrated in FIG. 2. It is probable that the effect of the gas streams intersecting on the extrudate steam is to cut the stream to cut the substantially continuous stream into staple and produce a less open, lower surface area product.

In FIGS. 3 and 4 there is shown an apparatus for continuously forming a cartridge of infinite length from which there can be severed individual cartridges of predetermined length. In FIG. 3 there is shown a work table 38 which at one end supports a drive mechanism 40. By means of a belt a water-cooled mandrel 42 is rotated.

Figure 6:
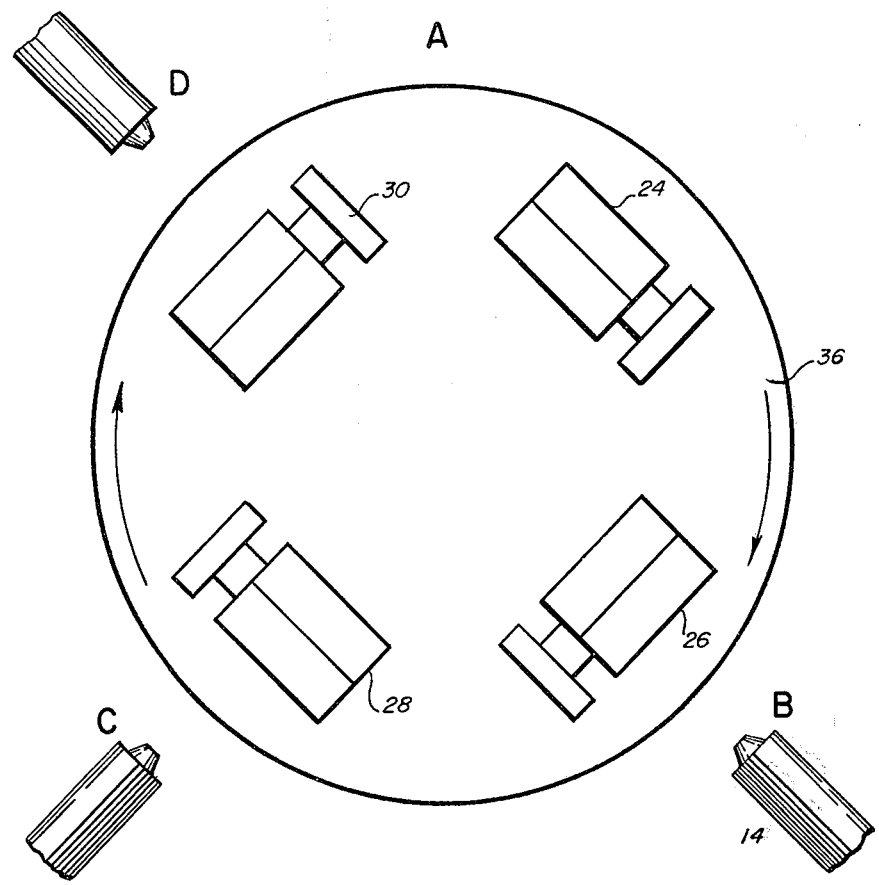
FIG. 6 is a schematic illustration of another embodiment of extrusion and collection apparatus which is semi-continuous in operation.

In FIG. 6 there is schematically shown an apparatus for producing a cartridge of varying density without the need for adjustment of any of the parameters during operation. A turntable 36 carried four driving rollers 28, one in each of positions A, B, C and D; 30 is the means for driving and traversing the rollers, as shown in FIG. 1. Each mechanism 30 includes a mandrel 24 on which a cartridge 26 is to form and the bias of the driving rollers 28 is predetermined. It may be constant or vary in dependence upon the size of the cartridge or the particular position on the work table, as desired, using conventional cams and spring mechanisms (not shown).

In each of positions B, C and D there is an extrusion nozzle 14, the spacing between the mandrels 24 and nozzles 14 being different in each position. The cartridge 26 in position B is relatively small, that in position C larger and than in D almost full size. After a predetermined length of time in one position the cartridges grow, and then the turntable is actuated to rotate one position in the direction of the arrow. This is achieved without interrupting polymer extrusion and collection.

The cartridge previously in position D advances to position A in which an operator removes the complete cartridge from the mandrel 24, leaving it temporarily empty as shown. Since the cartridge carries trailing ends from the movement between positions without interrupting extrusion, the operator also trims away any loose filamentary material and, if time permits, also trims away loose material which may extend from one position to the next.

The cartridges produced by the apparatus of FIG. 6 will comprise three sections of different density. If more sections are desired it is merely necessary to provide additional extruders about the turntable with additional positions on the turntable. The length of time in each position is necessarily the same so that if it is desired to provide a particularly thick section of a given density it is merely necessary to provide two nozzles in succession at the same spacing whereupon there will be formed a double thickness corresponding to that predetermined spacing. While not shown, means for providing solid particles on the cartridge as built up can also be arranged on the work table or in association with each nozzle opposite the work table by drive 40, the mandrel 42 extending less than about one half the length of the table. As can be seen in FIG. 4, an extruder barrel 44 discharges molten polymer to a manifold 46 provided with a plurality of outlet nozzles 48 along its length, which nozzles 48 may differ from one another in size. Each nozzle 48 discharges its extrudate, suitably attenuated by a corresponding gas blast, toward the rotating mandrel and cylinder built up thereon. The extruder barrel and nozzle have been removed from FIG. 3 for ease of viewing but there is visible in FIG. 3 (but not in FIG. 4, again for ease of viewing) a set of idler rolls 50 which bear on the fibrous cylinder with predetermined force. Supports 52 a, b and c are provided toward the right hand end of stand 38 to support the annular tube which projects beyond the end of the mandrel. If desired, a non-circular drive roll may be used so as to help rotate the cartridge tube and at the same time slowly advance it. The rotating cartridge tube extends to a station 54 which is provided with a pair of endless belts 56 moving very slowly so as to advance the tube as it forms, i.e., to pull the entire structure to the right and to feed to a station 58 where a blade 60 cuts it into predetermined lengths in conventional manner, i.e., either the blade advances with the tube or tube advance is momentarily interrupted so that the cut can be made.

In this manner each cartridge severed from the continuous tube can be of substantially identical density profile. The density at the innermost portion of the cartridge will be determined by the extrusion conditions at the left-most nozzles of FIG. 4 coupled with the idler roll conditions, while the density of the outermost portions will correspondingly be determined by the right-most nozzles and idler rolls.

The illustrated extrusion nozzle 14 has a center polymer exit orifice 15, as shown in FIG. 7, which ordinarily has a diameter of from about 0.01 to about 0.10 inch and preferably from about 0.015 to about 0.030 inch.

In the preferred embodiment, polymer is generally extruded through the nozzle at 1 to about 30 lb/hr., and desirably at 5 to 15 lb/hr.

Along side polymer exit orifice 15, as shown in FIGS. 7 and 8, are a plurality of attenuating substantially rectangular elongated gas orifices 18 having a width of from about 0.002 to about 0.050 inch, preferably from about 0.004 to about 0.025 inch, and a length of at least about 0.5 inch, preferably from about 1.0 to about 3.0 inches. Attenuating gas nozzles 18 emit substantially planar gas streams 17 and are positioned as illustrated in FIGS. 2 and 8.

FIGS. 8 and 9 show, in perspective, a preferred embodiment of a gas jet for emitting a substantially planar gas stream. The gas enters through gas inlet passage 25 and is emitted through rectangular elongated gas orifice 18.

The invention will be further described by the following illustrative examples:

EXAMPLE 1

Isotactic polypropylene having a molecular weight of about 350,000, a density of about 0.9 gm/cc., a melting point of about 160°C. and a degree of crystallinity of about 61 percent is spray spun through an orifice having a substantially circular cross section of about 0.016 diameter in accordance with the Example of U.S. Pat. No. 3,543,332, i.e., three steam passages discharging steam at 350°C. and 40 psig at a skew angle of 2° and an angle of convergence of 12° toward a filament of 0.03 inch diameter polypropylene extruded at 350°C. at a rate of 2.5 16/hr. The steam passages are 0.082 inch in diameter and are set off 0.290 inch from the axis of the polypropylene orifice where the steam exits. The polypropylene is extruded as an expanding cone having a diameter of about 2 inches just prior to collection on a metal drum. The extrudate is collected on the metal drum having a diameter of 1 inch and rotated at a speed of 100 rpm (a surface speed of about 7.7 meters per minute), the drum being unheated and initially spaced 6 inches from the extruder outlet. The product is collected as a 26 inch wide band with a weight of 4 kg pressing down on the outer rotating surface to densify the structure. After 10 minutes of extrusion and collection, the extrusion nozzle is moved back so it is 8 inches from the collector, the extrusion rate is reduced to 2 pounds per hour, and the weight on the collection roll surface is reduced to 2 kg. After 10 minutes the nozzle is moved back 10 inches from the collector, the extrusion rate is reduced to 1.5 pounds per hour and the weight is reduced to 1 kg. After another 10 minutes the extrusion rate is reduced to 1 pound per hour, the weight is altogether removed and extrusion is continued at the same 10 inch spacing between extruder and collector for 22 minutes more; extrusion is then discontinued.

For test purposes, the annular cylindrical mass is removed from the collector and a thin disk sawed off one end. Filaments in the disk range in denier from about 1 to 30 and in tenacity from about 0.3 to 1 gram per denier. The product is substantially free of shot.

Individual density measurements were made on the various sections of the filters outward along the radius. Several slices of approximately 0.3 inch each were taken off one end of each blank. Three concentric rings were cut from each slice with a special set of cork borers. The difference between the inside and the outside radius of each ring is approximately ¼ inch. The volume of each "doughnut" ring section was calculated from the various measurements on each section. Densities of the rings were calculated from their weights and calculated volumes. The density of the innermost, central and outermost rings were about 0.287, 0.230 and 0.220 gram per cc., respectively.

TABLE 1

| Ex. 1 Run | Outside Dia., In. | COLLECTION STAGE | | | | | | | | | | | Total Collection Time, min | Filter wt., g | Apparent Density, g/cc | | |
|---|---|---|---|---|---|---|---|---|---|---|---|---|---|---|---|---|---|
| | | 1st | | | 2nd | | | 3rd | | | 4th | | | | | | | |
| | | W* | D** | T*** | W | I | T | W | D | T | W | D | T | | | 4th, outside | 3rd & 2nd Middle | 1st Inside |
| A | 2.75 | 8 | 4 | 15 | 4 | 6 | 15 | 2 | 8 | 15 | 1 | 10 | 30 | 75 | 528 | 0.229 | 0.280 | 0.363 |
| B | 2.75 | 8 | 7 | 15 | 4 | 9 | 15 | 2 | 11 | 15 | 1 | 13 | 12 | 57 | 405 | 0.213 | 0.240 | 0.290 |
| C | 2.75 | 8 | 5 | 15 | 4 | 6 | 15 | 2 | 7 | 15 | 1 | 8 | 38 | 83 | 598 | 0.335 | 0.317 | 0.332 |
| D | 2.75 | 8 | 6 | 15 | 4 | 8 | 15 | 2 | 10 | 15 | 1 | 12 | 16 | 61 | 450 | 0.217 | 0.258 | 0.285 |
| E | 2.75 | 8 | 6 | 15 | 4 | 8 | 15 | 2 | 10 | 15 | 1 | 12 | 16 | 61 | 450 | 0.212 | 0.254 | 0.283 |

W = weight on idler roll, Kg
D = distance from spray nozzle to collection roll, inches
E = time for collection, minutes

EXAMPLE 2

Figure 10:
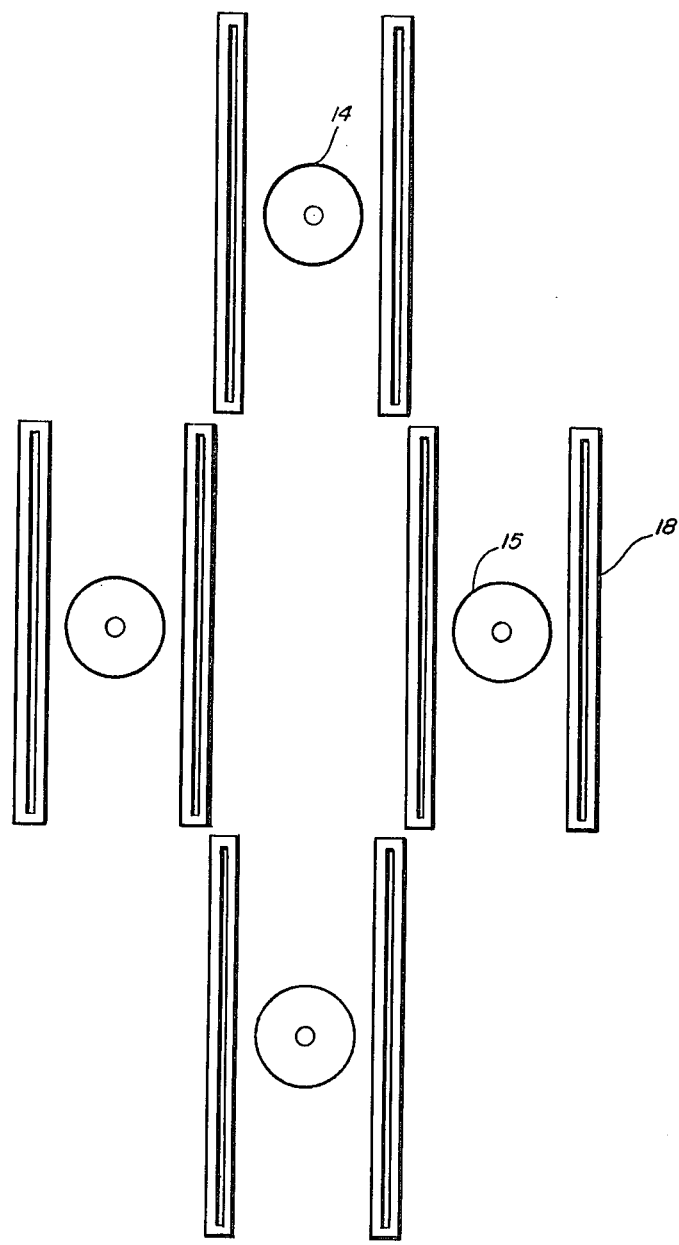
FIG. 10 is a schematic front elevation of the preferred arrangement for utilizing four extrusion nozzles.

Isotactic polypropylene having an intrinsic viscosity of 1.5, a density of about 0.9 gm/cc., and a melt flow rating of 30 is spray spun at a melt temperature of 390°C. through four extrusion orifices arranged as shown in FIG. 10. Each orifice is of a substantially circular cross-section having a diameter of about 0.016 inch. Referring to FIG. 10, two planar attenuating gas jets 18, as shown in FIG. 8, were spaced at a distance of 2 inches from the axis of each extrusion orifice 15 in approximately parallel relationship to each other along side each extrusion orifice. The elongated rectangular air jets had an orifice width of 0.010 inch and a length of about 1.88 inches and each emitted ambient air flowing at a rate of about 56 cubic feet per minute at a pressure of about 65 p.s.i.g. The polypropylene extrudate is collected on a metal drum having a diameter of 1 inch, as in Example 1, to produce annular cartridge filters having a varying density profile. The total throughput of polypropylene is about 6lb/hr.

Referring to FIG. 2, the gas jets 17 are positioned so that the planes of gas streams 18 intersect at a point 21 which is at a distance B of 5/16 inch from the axis of the extrudate stream which corresponds to nozzle axis 19. The distance A which defines the distance from the orifice 14 to the intersection point 21, is 4 inches. As a result, the planes of the gas streams intersect the axis of the extrudate stream at angles $\alpha_1$ and $\alpha_2$ of about 30° and 25° respectively.

The procedure is repeated, except that the extruder throughput is increased such that the total throughput of polypropylene being spray spun is 9 lb/hr.

EXAMPLE 3

Polypropylene, as in Example 2, is spray spun through one or more circular orifices, utilizing planar attenuating gas jets, as shown in FIG. 8, spaced at a distance of 2 inches from the axis of each extrusion orifice. The spray spun structure was collected on a cylindrical drum. The process conditions for 14 runs are summarized in Table 2 below:

TABLE 2

| Run No. | Extrusion Temp. (°C) | Extrusion orifice diameter (inches) | No. of orifices | Air Flow (CFM) | Air Pressure (PSIG) | Polymer Throughput (lbs/hr) | A (in.) | B (in.) | $\alpha_1$ (degrees) | $\alpha_2$ (degrees) | Collector Speed (feet per min.) | Distance from Nozzle to Collection drum (inches) | Surface area (square meters per gram) |
|---|---|---|---|---|---|---|---|---|---|---|---|---|---|
| 2  | 395 | 0.016 | 4 | 56 | 65 | 6   | 4 | 5/16 | 30 | 25 |    | 36.0 | 0.46 |
| 2a | 395 | 0.016 | 4 | 56 | 65 | 6   | 4 | 5/16 | 30 | 25 |    | 28.5 | 0.45 |
| 2b | 395 | 0.016 | 4 | 56 | 65 | 9   | 4 | 5/16 | 30 | 25 |    | 36.0 | 0.33 |
| 2c | 395 | 0.016 | 4 | 56 | 65 | 9   | 4 | 5/16 | 30 | 25 |    | 8.5  | 0.35 |
| 2d | 380 | 0.016 | 4 | 59 | 65 | 6   | 4 | 0    | 27 | 27 |    | 32.0 | 0.31 |
| 2e | 380 | 0.016 | 4 | 59 | 65 | 9   | 4 | 0    | 27 | 27 |    | 32.0 | 0.27 |
| 2f | 395 | 0.016 | 4 | 57 | 60 | 6   | 3 | 5/16 | 38 | 29 | 73 | 39.5 | 0.53 |
| 2g | 395 | 0.016 | 4 | 57 | 60 | 9   | 3 | 5/16 | 38 | 29 | 73 | 39.5 | 0.42 |
| 2h | 395 | 0.016 | 4 | 57 | 60 | 6   | 3 | 0    | 34 | 34 | 73 | 39.5 | 0.36 |
| 2i | 395 | 0.016 | 4 | 57 | 60 | 9   | 3 | 0    | 34 | 34 | 73 | 39.5 | 0.31 |
| 2j | 350 | 0.018 | 1 | 30 | 35 | 2.5 | 3 | 0    | 34 | 34 | 20 | 41.0 | 0.48 |
| 2k | 350 | 0.018 | 1 | 30 | 35 | 2.5 | 3 | 5/16 | 38 | 29 | 20 | 41.0 | 0.58 |
| 2l | 350 | 0.018 | 1 | 30 | 35 | 2.5 | 4 | 0    | 27 | 27 | 20 | 41.0 | 0.38 |
| 2m | 350 | 0.018 | 1 | 30 | 35 | 2.5 | 4 | 5/16 | 30 | 25 | 20 | 41.0 | 0.43 |

As shown in Table 2 above, surface area measurements were taken utilizing Orr Surface - Area Pore - Volume Analyzer (Model 2100A). The runs using the preferred process of this invention (2, 2a, 2b, 2c, 2f, 2g, 2k and 2m) exhibited a higher surface area than the runs wherein the attenuating gas streams intersected on the axis of the extrudate stream. A direct comparison can be made between runs 2f and 2h, 2g and 2i, 2j and 2k, and 2l and 2m. Increases in surface area of from 0.05 to 0.17 meters²/gram are achieved.

The higher the surface area, the greater the filtration efficiency of the structure.

The molecules in the surface layer of a solid are bound on one side to inner molecules but there is an imbalance of atomic and molecular forces on the other. The surface molecules attract gas, vapor, or liquid molecules in order to satisfy these latter forces. The attraction may be either physical or chemical, depending on the system involved and the temperature employed. Physical adsorption (frequently referred to as van der Waal's adsorption) is the result of a relatively weak interaction between a solid and a gas. This type of adsorption has one primary characteristic. Essentially all of a gas adsorbed can be removed by evacuation at the same temperature at which it was adsorbed.

While the first gas molecules to contact a clean solid are held more or less rigidly by van der Waal's forces, the forces active in the condensation of vapors become increasingly responsible for the binding energy in subsequent layer development. The expression $$V_2 = \frac{V_m CP}{(P_s - P)[1 + (C-1)P/P_s]} \qquad (1)$$

where $V_a$ is the volume of gas adsorbed at pressure P, $V_m$ the volume adsorbed when the entire adsorbing surface is covered by a monomolecular layer, C a constant, and $P_s$ the saturation pressure of the gas (actually the vapor pressure at a given temperature of a large quantity of gas condensed into a liquid), is obtained by equating the rate of condensation of gas molecules onto an adsorbed layer to the rate of evaporation from that layer and summing for an infinite number of layers. The expression describes the great majority of low temperature adsorption data. Physical measurements of the volume of gas adsorbed as a function of pressure at a fixed temperature, therefore, permit calculation of $V_m$, the volume of gas required to form a layer one molecule thick. Equation 1 can be rearranged to the linear form $$\frac{P}{V_a(P_s - P)} = \frac{1}{V_m C} + \left(\frac{C-1}{V_m C}\right)\frac{P}{P_s}$$

Then a plot of data for $P/V_a(P_s - P)$ versus $P/P_s$ gives a straight line, the intercept and slope of which are $1/V_m C$ and $(C-1)V_m C$, respectively. The value of $V_m$ is thus readily extracted from a series of measurements. From this information and knowledge of the physical dimensions of single molecules, the surface area of the adsorbing solid is computed.

EXAMPLE 4

Using an apparatus such as shown in FIG. 1, polypropylene having a density of about 0.9 is spray spun at a melt temperature of 355°C. onto a 1 inch diameter collection mandrel 6½ inches away from the nozzle tip. Initially, the idler roll is weighted with 8000 g. After 15 minutes collection, the weight is changed to 6000 g. and after another 15 minute collection period the weight is changed to 4000 g. The weight is finally changed to 2000 g. after another 15 minute collection period and collection is continued for an additional 28 minutes. The final filter is 2¾ inches in diameter and has apparent densities of 0.348, 0.265 and 0.210 g/cc respectively on the outside, middle and inside thirds of the cross-sections. The filter is quite strong and exhibited good self-bonding.

EXAMPLE 5

A series of filters are prepared at 354°C by spray spinning polypropylene having a density of about 0.9 onto a 1 inch diameter collection mandrel. The distance between the tip of the spinning nozzle and the collection mandrel is changed during the filter cartridge's preparation in a programmed manner. Also, the weight being applied to the idler roll is changed in a programmed manner along with collection times. Results obtained on several filter cartridges are summarized in accompanying Table 1. It can be seen from these runs that the apparent density of any section of the filter can be varied to any desired value. In addition, the reproducibility of the process is excellent as observed in the last two cartridges.

Figure 5:
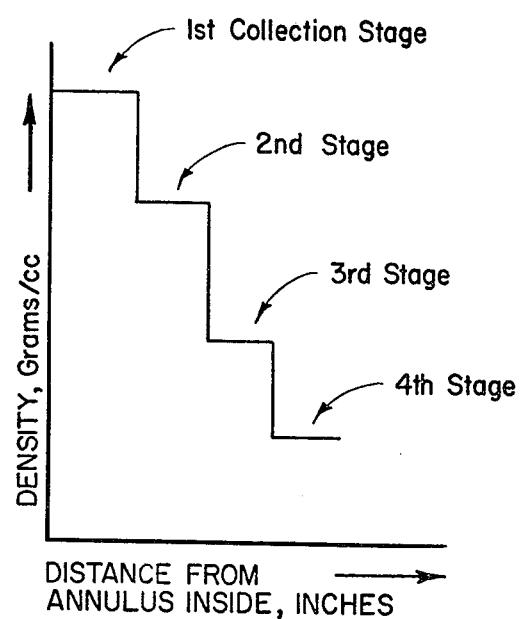
FIG. 5 is a curve showing the density profile of a preferred embodiment of an annular cylindrical cartridge filter produced in accordance with the present invention.

An idealized density profile for such products is illustrated in FIG. 5.

EXAMPLE 6

Another series of filters is prepared with varying idler roll weights, including one where no weight at all was applied. In these runs, the results of which are set out in Table 3, it can be seen that the density increases fromm inside to outside.

EXAMPLE 7

Another set of runs is undertaken wherein the distance between the spray nozzle and the collection mandrel as well as the weight of the idler roll are varied in a programmed manner. At set intervals the collection distance is increased and weight is removed from the idler roll. The results, as set out in Table 4, show that the density gradient can be controlled as desired.

EXAMPLE 8

The results of another set of runs using polypropylene having a density of about 0.9 and the apparatus of FIG. 1 are shown in Table 5. Two specific parameters are used to obtain any specific density. As can be seen from the first four runs, A–D, increasing the collection distance, while holding all other conditions constant, leads to a density decrease. However, density differences can also be obtained by variation of the idler roll pressure, as can be seen by comparing runs B and E.

EXAMPLE 9

Reproducibility of the systems can be seen from the results in Table 6, using the same polymer and apparatus as in Example 6. Runs A; B and C; and D and E are prepared on different days under the same set of conditions. All runs are 62 minutes. Averages are shown for the five samples and it can be seen that the deviation on the average of the individual samples is only about ±3% on the inside density. Much closer agreement is noted in the other areas.

TABLE 3

EFFECT OF PROGRAMMED REDUCTION OF IDLER ROLL WEIGHT ON CARTRIDGE DENSITY GRADIENT

| Ex. 4 Run | Polymer Melt Temp., °C | Distance from Nozzle, inches | Idler Roll Weight (g × 1000)/Time (min) Collection Stage 1 | 2 | 3 | 4 | 5 | Total Time of Collection min | Density g/cc Outside | Middle | Inside |
|---|---|---|---|---|---|---|---|---|---|---|---|
| A | 358 | 6.5 | 7/15 | 4/15 | 3/15 | 2/15 |  | 60 | 0.287 | 0.258 | 0.256 |
| B | 356 | 7.5 | 8/10 | 7/10 | 6/10 | 4/10 | 1/9 | 49 | 0.252 | 0.230 | 0.197 |
| C | 355 | 6.5 | 8/15 | 6/15 | 4/15 | 2/28 |  | 73 | 0.348 | 0.265 | 0.210 |
| D | 352 | 4.0 |  |  |  |  |  | 120 | 0.505 |  | 0.306 |

TABLE 5

ABILITY TO SPRAY SPIN SPECIFIC CARTRIDGE DENSITIES

| Ex. 5 Run | Distance from Nozzle, inches 1 | Roll Weight, g × 1000 Collection Stage 2 | 3 | Time, min 4 | Total Filter Weight, g | Total Collection Time, min | Outside Filter Diam, in. | Density, g/cc Outside | Middle | Inside |
|---|---|---|---|---|---|---|---|---|---|---|
| A | 4/8/15 | 6/4/15 | 8/2/15 | 10/1/29 | 535 | 74 | 2.75 | 0.229 | 0.280 | 0.363 |
| B | 5/8/15 | 7/4/15 | 9/2/15 | 11/1/23 | 483 | 68 | 2.75 | 0.220 | 0.260 | 0.302 |
| C | 6/8/15 | 8/4/15 | 10/2/15 | 12/1/17 | 442 | 62 | 2.75 | 0.210 | 0.240 | 0.292 |
| D | 7/8/15 | 9/4/15 | 11/2/15 | 13/1/12 | 405 | 57 | 2.75 | 0.213 | 0.240 | 0290 |
| E | 5/8/15 | 7/6/15 | 9/4/15 | 11/2/25 | 525 | 70 | 2.75 | 0.226 | 0.280 | 0.367 |
| F | 6/8/15 | 8/6/15 | 10/4/15 | 12/2/17 | 459 | 62 | 2.75 | 0.223 | 0.246 | 0.285 |

TABLE 4

EFFECT OF PROGRAMMED DISTANCE AND IDLER ROLL WEIGHT VARIATION ON CARTRIDGE DENSITY GRADIENT

| Ex. 5 Run | Distance from Nozzle, inches 1 | 2 | Roll Weight, g × 1000 Collection Stage 3 | 4 | 5 | Time, min | Total Collection Time, min | Density, g/cc Outside | Middle | Inside |
|---|---|---|---|---|---|---|---|---|---|---|
| A | 6/8/15 | 7/6/15 | 8/4/15 | 9/2/15 |  |  | 60 | 0.217 | 0.263 | 0.303 |
| B | 6/8/10 | 7/6/10 | 8/2/15 | 9/1/15 | 10/0/3 |  | 53 | 0.175 | 0.219 | 0.242 |
| C | 6/8/10 | 8/6/10 | 10/4/10 | 11/2/15 | 12/0/7 |  | 67 | 0.152 | 0.187 | 0.225 |

TABLE 6

REPRODUCTION OF SPRAY SPUN FILTER CARTRIDGE DENSITY GRADIENT

| Ex. 9 Run | Distance from Nozzle, inches 1 | Roll Weight, g × 1000 Collection Stage 2 | 3 | Time, min 4 | Total Filter Weight, g. | Outside Filter Diam., in. | Density, g/cc Outside | Middle | Inside |
|---|---|---|---|---|---|---|---|---|---|
| A | 6/8/15 | 8/4/15 | 10/2/15 | 12/1/17 | 442 | 2.75 | 0.210 | 0.240 | 0.292 |
| B | 6/8/15 | 8/4/15 | 10/2/15 | 12/1/17 | 448 | 2.75 | 0.212 | 0.254 | 0.283 |
| C | 6/8/15 | 8/4/15 | 10/2/15 | 12/1/17 | 450 | 2.75 | 0.217 | 0.258 | 0.285 |
| D | 6/8/15 | 8/4/15 | 10/2/15 | 12/1/17 | 440 | 2.75 | 0.204 | 0.241 | 0.311 |
| E | 6/8/15 | 8/4/15 | 10/2/15 | 12/1/17 | 440 | 2.75 | 0.207 | 0.239 | 0.304 |
|  |  |  |  | Average | 444 |  | 0.210 | 0.246 | 0.295 |

EXAMPLE 10

Polypropylene having a density of about 0.9 is spray spun at a melt temperature of 345°C onto the collection mandrel 8 inches from the nozzle tip. The idler roll is weighted with 1000 g. After 20 minutes collection, carbon black granules of about 1 mm. diameter are fed into the filament stream prior to its deposition onto the filter cartridge until the desired quantity of material is incorporated. The collection mandrel is moved to 12 inches and fiber collection is continued until the desired cartridge size is obtained. The product includes three zones in which the innermost and central zones are of substantially the same density except that the central zone includes the particles of carbon black. The outside zone is of lower density as a result of the greater distance between mandrel and nozzle, resulting in a less compact structure.

EXAMPLE 11

Polypropylene having a density of about 0.9 is spray spun at a melt temperature of 345°C. onto the collection mandrel 8 inches from the nozzle tip. The idler roll is weighted with 1000 g. The center portion of the cartridge filter is spun for about 20 minutes. A slurry of carbon black in water is prepared and introduced onto the filter by contacting the idler roll with a roll containing the slurry. The idler roll transfers the slurry to the forming filter cartridge. After the desired amount of material is added, the collection device is moved to 12 inches away from the nozzle tip and collection is continued until the desired filter size is prepared.

In similar manner other solids such as ion exchange resins, deodorizers, decolorizers, diatomaceous earths, etc., may be incorporated into the filter cartridges.

EXAMPLE 12

A cartridge prepared as in Example 1 is immersed for 64 hours in hot automotive engine oil at 120°–125°C. The initial and final cartridge dimensions are:

| Cartridge Size | Length (inches) | Diameter (inches) Inside | Outside |
|---|---|---|---|
| Initial | 3.250 | 0.950 | 2.732 |
| Final | 3.407 | 1.005 | 2.890 |

Physically the cartridge does not appear to be changed in any respect by the hot oil. This indicates the filter can safely be used as an automotive oil filter.

EXAMPLE 13

Slices of the initial filter of Example 10 are immersed in a variety of liquids for 30 days. Size measurements before and after exposure are summarized in Table 7. No major structural changes are observed resulting from the exposure. These tests indicate that the spray spun structure is quite stable to a variety of liquids.

TABLE 7

EFFECT OF VARIOUS LIQUIDS ON THE SPRAY SPUN FILTER CARTRIDGE

| Ex. 13, Run | Solvent Used | Cartridge Size, (inches) | | | |
|---|---|---|---|---|---|
| | | Outside Diameter | | Thickness | |
| | | Initial | Final | Initial | Final |
| A | Acetone | 2.745 | 2.768 | .460 | .465 |
| B | Methylene chloride | 2.742 | 2.836 | .492 | .500 |
| C | Mobil gasoline (reg.) | 2.747 | 2.904 | .489 | .519 |
| D | Hydraulic oil (Enerpac HF 101) | 2.743 | 2.839 | .473 | .480 |
| E | 30% Hydrogen peroxide | 2.744 | 2.747 | .505 | .500 |
| F | Distilled water | 2.740 | 2.745 | .490 | .484 |
| G | Conc. Sulfuric Acid | 2.740 | 2.728 | .492 | .500 |
| H | 50% Sulfuric Acid | 2.740 | 2.748 | .504 | .495 |
| J | Valvoline Oil | 2.740 | 2.809 | .504 | .512 |

EXAMPLE 14

In a further series of runs to illustrate the effects of variations in process conditions, it is shown that increasing the melt temperature of polypropylene in the range of 340° to 360°C. results in finer polypropylene fibers. Increasing the polymer delivery rate over the range of 3 to 20 grams per minute per nozzle results in coarser fibers. Increasing the pressure on the attenuating air over the range of 20 to 45 pounds per square inch results in finer fibers. Increasing the distance between the nozzle and the collector over the range of 4 to 18 inches results in a lower density product and increasing the rotational speed of the mandrel over the range of 100 to 500 rpm produces a lower density product. In conventional molded fiber filters an increase in density corresponds to finer pores in the structure and a higher resistance to flow. By contrast, spray spun structures in accordance with the invention can have their densities established independently of pore size which later can be controlled by the fiber diameter and packing. The filters are tested for performance in water filtration, including a test for crushing strength wherein the filter is sealed in a thin polyethylene film to simulate the worst possible clogging situation when there is no liquid flow whatsoever, then the encased filter is mounted in a standard transparent filter housing. Water pressure is applied gradually until surface deformation, catastrophic collapse or a pressure of 60 pounds per square inch is observed. All filters other than those wherein the fibers are extremely fine and loosely bonded performed with no deterioration or collapse in such a test. These tests show that the crushing strength can be tailored independently of the overall product density by proper selection of fiber fineness and degree of bonding. Similarly, the resistance to liquid flow can be tailored independently of density, i.e., contrary to molded products it is possible to obtain maximum resistance at lowest density by proper selection of fiber diameter and pore size. The results of such tests are shown in the following Tables 8 to 10.

TABLE 8

INFLUENCE OF PROCESS VARIABLES ON FILTER DENSITY AND STRENGTH

| Ex. 14 Run | Melt Temp. °C | Polymer Rate g/min. | Collection Distance Start | Collection Distance Finish | Average Density g/cc | Crushing Strength lb/in² |
|---|---|---|---|---|---|---|
| A | 350 | 7.6 | 6.5 | 9.5 | 0.33 | 60+ |
| B | 350 | 7.6 | 6.5 | 12.5 | 0.25 | 60+ |
| C | 360 | 7.7 | 5.5 | 8.5 | 0.27 | 50 |
| D | 360 | 7.8 | 6.0 | 9.0 | 0.24 | 35 |
| E | 360 | 7.8 | 6.5 | 9.5 | 0.24 | 40 |
| F | 360 | 7.6 | 5.0 | 8.0 | 0.37 | 62+ |
| G | 360 | 7.6 | 5.5 | 8.5 | 0.34 | 50 |
| H | 360 | 7.6 | 6.0 | 9.0 | 0.30 | 35 |
| J | 360 | 7.6 | 6.5 | 9.5 | 0.28 | 35 |
| K | 360 | 7.6 | 7.0 | 10.0 | 0.24 | 20 |

TABLE 9

INFLUENCE OF PROCESS VARIABLES ON FIBER DIAMETER AND FLOW RESISTANCE

| Ex. 14 Run | Melt Temperature °C | POlymer Rate g/min. | Relative Fiber Diameter | Average Density g/cc | Crushing Strength lb/in² | Pressure Drop (cm Hg) at Water Filtration Rate in gal/min. of 4 | 7 | 10 |
|---|---|---|---|---|---|---|---|---|
| L | 344 | 7.6 | Coarse | 0.30 | 60+ | 1.9 | 7.0 | 15.4 |
| M | 344 | 7.6 | Coarse | 0.30 | 60+ | 1.9 | 7.0 | 15.4 |
| N | 344 | 5.1 | Medium | 0.29 | 60+ | 3.7 | 11.2 | 21.6 |
| O | 344 | 5.0 | Medium | 0.29 | 60+ | 3.2 | 10.3 | 20.3 |
| E | 360 | 7.8 | Fine | 0.26 | 40 | 7.0 | 18.9 | 36.1 |
| C | 360 | 7.7 | Fine | 0.27 | 50 | 7.3 | 18.8 | 35.8 |

TABLE 10

NOMINAL MICRON RATING — FINE SPRAY SPUN FILTERS

| Ex. 14 Run | Average Density g/cc | Beginning Flow Rate gal/min. | Mean Flow Rate gal/min. | Cumulative Flow Gallons ΔP-20 lb/in² | ΔP-50 lb/in² | Dust Retained To 30 lb/in² g | % |
|---|---|---|---|---|---|---|---|
| O(i) | 0.23 | 10 | 8.7 | 11 | 13 | 12.5 | 96 |
| O(ii) | 0.23 | 10 | 8.3 | 21 | 25 | 19.1 | 76 |
| P(i) | 0.23 | 10 | 7.6 | 16 | 19 | 14.9 | 79 |
| P(ii) | 0.23 | 3 | 2.2 | 19 | 26 | 16.8 | 65 |
| Q(i) | 0.22 | 3 | 1.6 | 16 | 24 | 19.8 | 83 |
| Q(ii) | 0.22 | 3 | 1.3 | 9 | 17 | 16.9 | 98 |
| R(i) | 0.23 | 3 | 1.7 | 16 | 26 | 21.3 | 82 |
| R(ii) | 0.23 | 3 | 1.0 | 16 | 25 | 17.4 | 71 |
| S(i) | 0.21 | 3 | 1.4 | 16 | 24 | 19.6 | 82 |
| S(ii) | 0.22 | 3 | 1.4 | 18 | 25 | 22.2 | 90 |
|  |  |  |  |  |  |  | 82% Mean |

Test Conditions:
Supply Pressure  50 lb/in²
Flow Rate  3 or 10 gal/min.
Contaminant  AC Fine Dust
Concentration  1 g/gal The foregoing Table 10 shows that a series of spray spun filters, subjectively characterized, do indeed contain over 80% of test dust. The particle size distribution of the dust shows that 39% of that collected is of less than 5 micron particle size, attesting to the effectiveness of the filter.

The spray spun cartridge filters of this invention are also useful as absolute filters, carburetor air filters and filters for cryogenic fluids such as air, nitrogen, oxygen, hydrogen, and the like, both during production and use where the temperatures are less than about 0°C and usually below about −100°C. Such filters can easily be formed or cut into whatever sizes or shapes are desired, including annular cylinders, and because they can yield under strong pressures, they can be periphally clamped, if necessary, to provide a tight seal and prevent liquid by-pass.

The preferred fiber-forming polymers employed in the present invention are the polyolefins, such as polyethylene or polypropylene. The melt index of the polyolefin prior to extrusion will ordinarily be from about 5 to 60 and preferably from about 15 to 40. The intrinsic viscosity will be from about 1.0 to about 2.5 and preferably from about 1.0 to about 2.0.

Instead of the polyolefins, one may also employ other thermoplastic, melt-extrudable, fiber-forming polymers such as polyamides, polyesters, polyacetals, polyurethanes, polystyrene, and cellulose esters, e.g., cellulose acetate. With some of the polymers, spray spinning is aided by mixing the polymer with a melt depressant to facilitate melting without decomposition.

Air will normally be employed as the attenuating gas for reasons of economy. Other gases, e.g., steam, nitrogen, helium, etc., are also suitable. Usually, the attenuating gas will be at ambient temperature. Heated gas, e.g., at a temperature of 250° to 500°C., may also be advantageously used, however.

It will be appreciated that the instant specification and examples are set forth by way of illustration and not limitation, and that various modifications and changes may be made without departing from the spirit and scope of the present invention.

What is claimed is:

1. A self-bonded annular cylindrical non-woven fibrous structure consisting essentially of randomly arranged self-bonded substantially continuous synthetic organic polymeric melt-extruded, fiber-forming material, the density of said structure at at least two different locations in its thickness differing at some intermediate location by at least about 10% from two locations on either side thereof in its thickness.

2. A structure according to claim 1, wherein the density is substantially at its highest adjacent the inside of said annular cylinder and falls by at least about 10% toward the outside.

3. A structure according to claim 2, wherein the density thereafter again rises toward the outside and said synthetic organic polymeric fiber-forming material is selected from the group consisting of polyolefins, polyamides, polyesters, cellulose esters, polyurethanes, and polystyrene.

4. A structure according to claim 3, wherein starting from the inside the density rises gradually to a value less than about 10% greater than initially, then drops relatively rapidly to a value more than about 10% less than initially and thereafter rises again.

5. A structure according to claim 4, wherein upon again rising the density is less than about 10% greater than immediately before again rising, and after again rising the density again drops relatively rapidly to a value more than about 10% less than immediately before again dropping.

6. A structure according to claim 2, wherein said fibrous material comprises polypropylene of about 1 to 25 denier, the structure containing particles of solids therein but absent from at least the inner surface thereof to a depth of at least about 3/16 inch.

7. A structure according to claim 6, wherein said particles comprise carbon.

8. A structure according to claim 1 wherein said synthetic organic polymeric fiber-forming material is selected from the group consisting of polyolefins, polyamides, polyesters, cellulose esters, polyurethanes, and polystyrene.

9. A structure according to claim 1, wherein the density at any given part of said structure is less than 50 percent of the density of the polymer substrate.

10. A structure according to claim 1, wherein the density is less than 0.45 gram per cubic centimeter and the polymer substrate is polypropylene.

11. A structure according to claim 1, wherein the density ranges from 0.1 to 0.5 gram per cubic centimeter.

* * * * *